United States Patent

[11] 3,577,000

| [72] | Inventor | David A. Warner<br>Cambridge, Mass. |
| --- | --- | --- |
| [21] | Appl. No. | 851,981 |
| [22] | Filed | Aug. 21, 1969 |
| [45] | Patented | May 4, 1971 |
| [73] | Assignee | the United States of America as represented by the Secretary of the Air Force. |

[54] SYNCHRORESOLVER WITH OPTICAL FEEDBACK LOOP
13 Claims, 11 Drawing Figs.

[52] U.S. Cl. .................................................. 250/230, 250/231
[51] Int. Cl. .................................................. G01d 5/30, G01d 5/34
[50] Field of Search ......................................... 250/237, 231 (E), 230, 237 (G)

[56] References Cited
UNITED STATES PATENTS

| 2,685,083 | 7/1954 | Beman | 250/231UX |
| --- | --- | --- | --- |
| 3,384,754 | 5/1968 | Albarda | 250/237 |

*Primary Examiner*—Archie R. Borchelt
*Assistant Examiner*—T. N. Grigsby
*Attorneys*—Harry A. Herbert, Jr. and Jacob N. Erlich

ABSTRACT: A synchroresolver having a reflective means, a radiant source, a lens and a pair of energy sensors for determining the angular displacement of a rotating body. The reflective means may constitute a reflective prism, a plurality of convex cylindrical reflectors, or the combination of both. The radiant source reflects its radiant energy off the reflective means and onto the pair of energy sensors. The voltage output of the energy sensors is then utilized in making the desired angular determinations.

INVENTOR.
DAVID A. WARNER
BY Harry A. Herbert Jr
Jacob N. Erlich and
ATTORNEYS

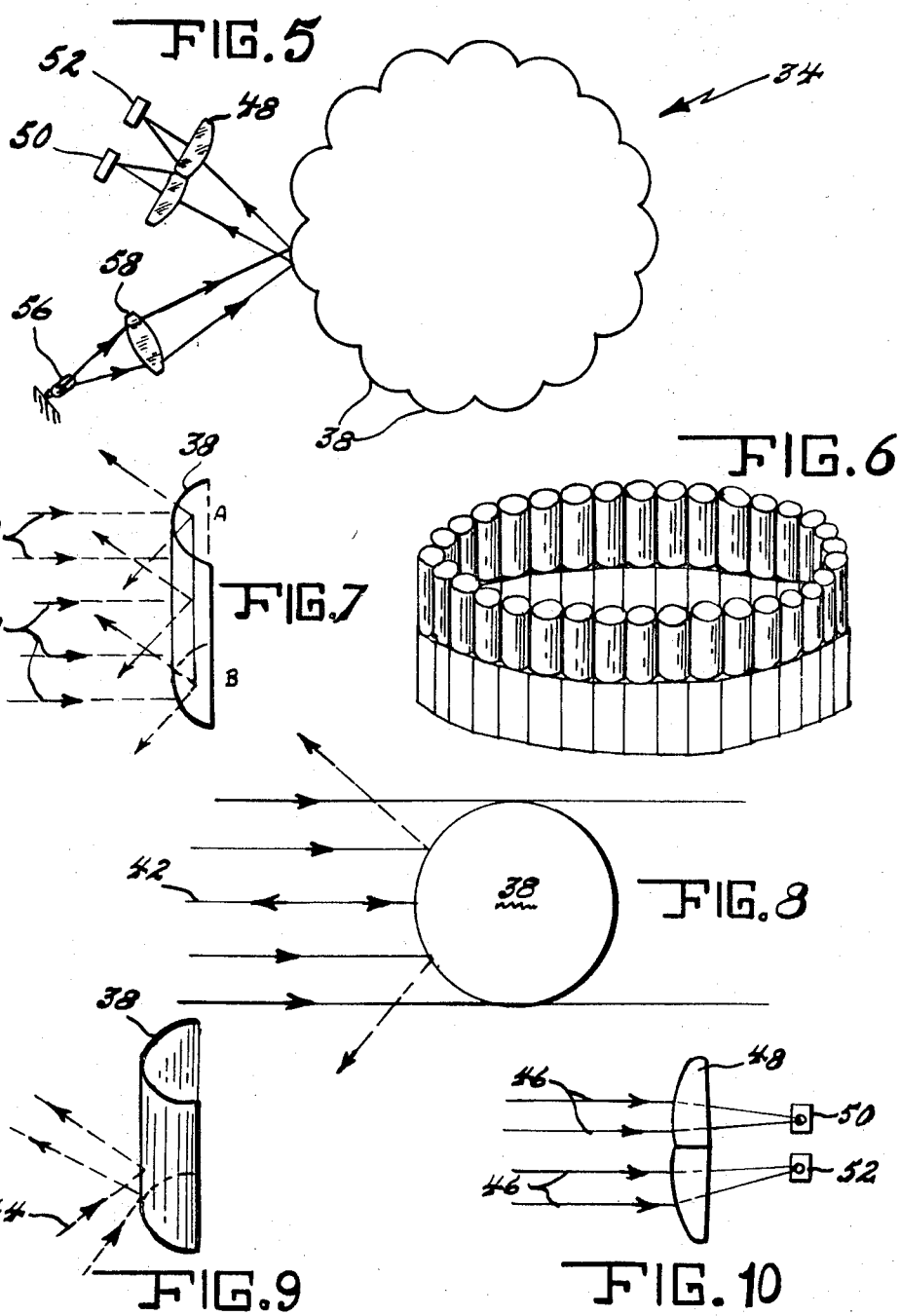

SYNCHRORESOLVER WITH OPTICAL FEEDBACK LOOP

BACKGROUND OF THE INVENTION

This invention relates generally to synchroresolvers and, more particularly, to a synchroresolver which utilizes an optical feedback loop to attain extreme accuracy in determining the angular displacement of rotated bodies.

In many instances it becomes essential that the angular displacement of a rotating body be determined to a high degree of accuracy. Such a determination may be required proximate the location of the rotating body or at a remote location.

Heretofore, ordinary inexpensive resolver-synchros were utilized in determining the angular displacement of a master rotor. These synchros are a name applied to a wide variety of rotary transducers, which are actually synchronous AC motors (or generators) adapted to serve as variable transformers in the measurement of angular positions.

The construction of such a synchro is similar to that of a miniature three-phase synchronous motor or generator. The stator, which contains the three-phase winding, is a slotted cylindrical structure made up of punched steel laminations, and the rotor contains a single winding, which may be of the salient-pole type, the umbrella type, or the slotted-cylinder type.

Instead of exciting the rotor field with a DC current and driving the shaft at a constant velocity as in an alternator, the rotor field is excited with a constant single-phase AC voltage, and the shaft moves at only low speeds, often standing completely still. This unit, called a synchrogenerator, is basically a transformer with one primary (the rotor winding) and three secondaries (The Y-connected windings of the stator). The voltages induced in the secondary windings are proportional to the cosines of the angles between each stator coil and the rotor. Thus, an electrical reference frame is formed which may be read at a remote point by means of another synchro, called a synchrocontrol transformer, operating in reverse fashion.

The synchro is completely single phase; the term three-phase winding is a misleading carryover from the field of AC power machinery to describe a stator that is made up of three fields oriented at 120° to each other.

The voltage $E_o$ is a maximum when the control transformer rotor angle $\alpha$ coincides with the generator rotor angle $\theta$. To achieve a null condition, the control transformer rotor position must be at an angle of 90° with respect to the generator rotor angle. Thus, if the control transformer rotor position is defined as $\beta=\alpha+90°$, then $\beta$ will be equal to $\theta$ when the output voltage $E_o$ is at a minimum (theoretically zero). Two synchros may be used in this way as an error-detector system, with the output voltage $E_o$ representing the error $(\theta-\beta)$.

The best null condition attainable for $E_o$ is limited by quadrature effects resulting from extraneous phase shifts between the various transformer windings due to slight differences in impedance characteristics. Special care must be exercised in the manufacture of synchros to attain good performance. When the rotors of synchros are driven at high speeds, extraneous voltages are induced by generator action, and the output signal is not an accurate representation of rotor angle difference.

It is also evident that the synchros heretofore in use were only accurate and repeatable to 10—15 minutes of arc. Furthermore, in order to achieve any more accuracy great expense was involved and in many instances even with the additional expense the increased size of the synchro made its use in certain circumstances prohibitive.

SUMMARY OF THE INVENTION

The synchroresolver of this invention overcomes the problems heretofore encountered and as set forth in detail hereinabove.

The synchroresolver of this invention utilizes an optical feedback loop. In determining, for example, the angular displacement of a rotating body, a pair of such synchroresolvers are needed. A pair of multisided reflective prisms, one of which is mounted on the master shaft (the shaft being rotated an unknown number of degrees) and the other to a slave shaft (the shaft which is used to determine the number of degrees rotated by the master) constitute an essential part of the synchroresolvers of the instant invention. For more accuracy an optical rotor made up of a plurality of tangential glass or quartz optically polished convex cylindrical reflectors may be substituted for or used in combination with the reflective prisms. For simplicity, however, only the operation of the reflective prisms will be set forth in the "Summary of the Invention" with the operation of both the reflective prisms and the convex cylindrical reflectors being set forth in detail hereinbelow in the "Description of the Preferred Embodiments."

The prisms utilized in the instant invention are fabricated from one large prism which is divided in half to form a pair of identical prisms. The prisms' face-to-face angular accuracy need not be obtained to any particular high precision; the only stipulation in the manufacture is that any given prism face be consistent within itself, i.e., flat and constant in angular deviation from its adjacent neighboring prism faces. The polish on any given prism face should be of optical quality.

Upon completion of fabrication of the prism, they are mounted on two separate shafts as explained hereinabove, one of which being the master which is to be rotated through some unknown angle, the other being the slave. The slave containing the second of the identical prisms can then be rotated to the exact position of the master by proper utilization of the synchroresolvers of this invention.

A crucial part of this invention is the utilization of four energy sensors, two for each synchroresolver, with each sensor having similar or preferably identical output for the same energy flux input. These sensors may be for example solar cells, photodiodes, photoconductive cells, photomultipliers or almost any other light transducers. The preferred sensor for this invention is the silicon solar cell. Two radiant sources, one for each synchroresolver, are required in utilization of the instant invention and these sources should be as nearly as identical as possible. Preference is given to filament lamps; however, gas lamps or the newer solid-state devices may also be used. Small variations in output may be overcome by varying the input voltage or power to the lamp.

A pair of lenses are also necessary and these lenses should both be substantially of the same quality and characteristics. Basically the purpose of the lenses is to convey energy from the radiant source to the prism face and then to the cell pair. The cells are arranged in a shingle configuration so as to produce the correct voltage outputs.

As the radiant source conveys the energy to a prism face and back to the cell pair an output is registered from the cell pair. This output from the master is noted and then duplicated by the slave in order for the slave to determine the number of degrees rotated by the master.

For example, in operation, the angular rotation of the master is determined to its approximate degree of rotation by an ordinary synchrosystem well known in the art and set forth hereinabove. At this point it is substantially guaranteed that the energy emanating from the radiant sources of the synchroresolvers of this invention is reflecting off of the corresponding matched faces of the prism on both the slave and master.

In other words, the output determined by the ordinary synchrosystems will put us near to the null region of the cell pair output in the synchro-optical system of this invention. The outputs of the cell pairs of the master and slave synchro are then compared by ultimately switching between them, that is chopping the output signals. The slave shaft is rotated until the output signal from its cell pair corresponds to the output from the cell pair of the master. In this manner utilizing the mirrorlike cell system of this invention, the angular repeatability of 1 arc second or less in practical size configuration is possible.

As pointed out hereinabove to increase the accuracy of the reflective prism, a plurality of optically polished convex cylindrical reflectors may be used in place of or in combination with the reflective prisms and its operation will be set forth in detail hereinbelow.

It is therefore an object of this invention to provide a synchroresolver with an optical feedback loop which is extremely accurate in making angular determinations of rotating bodies.

Another object of this invention is to provide a synchroresolver with an optical feedback loop which produces high reliability with an extremely low cost of operation.

It is another object of this invention to provide a synchroresolver with an optical feedback loop which is economical to produce and which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DESCRIPTION OF THE DRAWING

FIG. 5 represents a diagrammatic view of a modified synchroresolver of this invention;

FIG. 6 represents a pictoral view of the combination of a reflective prism and a plurality of convex cylindrical reflectors; utilized in the modified synchroresolver of this invention;

FIGS. 7—9 represent a schematic view of an energy beam in relation to a convex cylindrical reflector utilized in the modified synchroresolver of this invention;

FIG. 10 represents a diagrammatic view of a reflected beam striking a pair of energy sensors in the modified synchroresolver of this invention; and FIG. 11 represents a voltage wave pattern resulting from the synchroresolver of FIG. 5.

DESCRIPTION OF THE PREFERRED EMBODIMENTS

Figure 1:
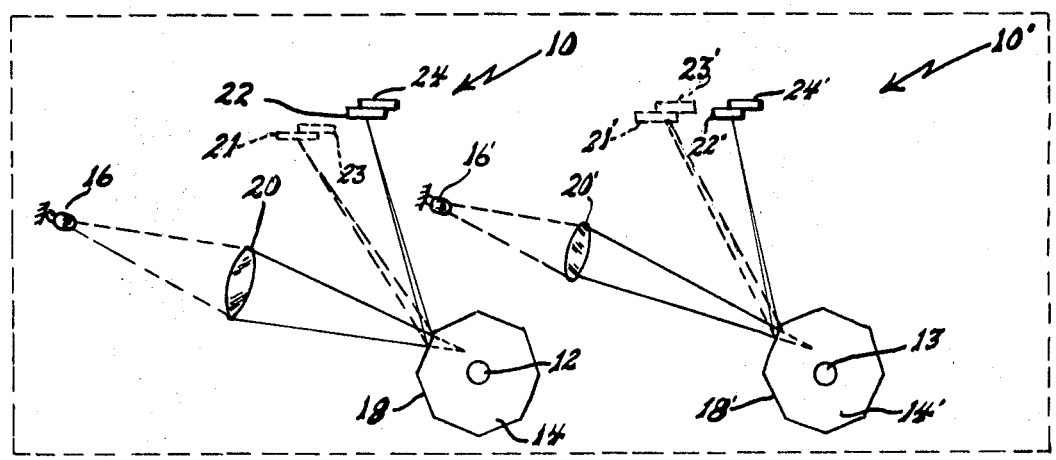
FIG. 1 represents a diagrammatic view of a pair of the synchroresolvers of this invention in operation.

Reference is now made to FIG. 1 of the drawing wherein a pair of the synchroresolvers 10 and 10' of this invention are shown in use making the determination of the angular displacement of a rotating body, master shaft 12. Since both the synchroresolvers 10 and 10' are identical, the description of the elements constituting the synchroresolver of this invention will be explained with reference to resolver 10 and all of the identical elements of resolver 10' mounted on slave shaft 13 will have identical numerals with a prime (') thereafter.

The master shaft 12 has a prism 14 fixedly secured thereto, with a radiant source 16 mounted proximate the prism 14 in such a position as to direct its radiant energy onto the reflective surfaces or prism faces 18 of prism 14. A lens 20 is positioned between radiant source 16 and prism 14 with a pair of energy sensors 22 and 24 fixedly positioned adjacent prism 14 to receive the energy which has reflected off a prism face 18.

Figure 2:
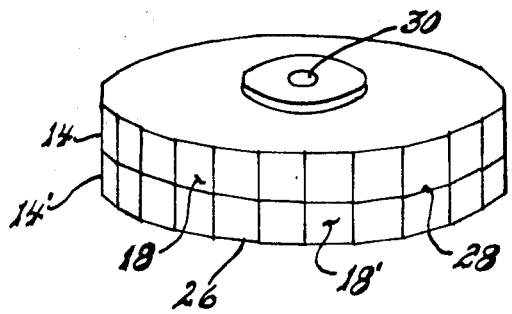
FIG. 2 represents a pictoral view of the reflective prism utilized in the synchroresolver of this invention.

Referring now to the individual elements making up this invention, the prisms 14 and 14' (see FIG. 2) are fabricated from a larger prism 26.

This prism 26 is cut in half at 28 to thereby form a pair of identical reflective prisms 14 and 14', one of which is mounted on the master shaft 12, the other of which is mounted on the slave shaft 13 (see FIG. 1). The face-to-face angular accuracy of the prism 26 need not be maintained to any particular high precision; however, it is important that any given prism face 18 be consistent within itself, that is, flat and constant in angular deviation from its adjacent neighboring prism faces 18. The polish on any given prism face 18 should be of optical quality. However, this also is really not a stringent requirement since neither the prism not their faces are required to be particularly large. It is important that these prisms 14 and 14' be mounted on the same centers of rotation 30 but onto separate synchroshafts, the master 12 and the slave 13.

The energy sensors 22, 24, 22' and 24' may be solar cells, photodiodes, photoconductive cells, photomultipliers or almost any energy transducer. However, the preferred energy sensor utilized in this invention is a silicon solar cell. Since four such cells of identical or nearly identical characteristics are required, they may be manufactured by cutting a single large cell into four single pieces.

The radiant sources 16 and 16' for each the master and slave unit, respectively, of the synchroresolver 10 of this invention should be nearly as identical as possible. Filament lamps may be utilized as the radiant source 16; however, gas lamps or newer solid-state devices may also be used. Small variations in output may be overcome by varying input voltage or power to the lamps. The lenses 20 and 20' should be of the same quality and characteristics and their function in this invention is to convey energy from the source 16 to the prism face 18 and then to the cell pairs 22 and 24.

Figure 3:
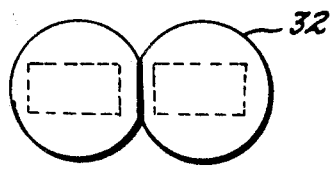
FIG. 3 represents a plan view of a modified energy sensor utilized in the synchroresolver of this invention.

The cells 22 and 24 are made of a shingle configuration as shown in FIG. 1; however, they may also be of any other convenient design such as the butted lens pair 32 as indicated in FIG. 3. As previously pointed out identical systems are used for both the master and the slave.

Figure 4:
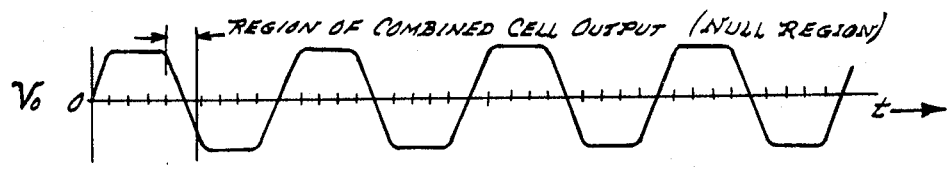
FIG. 4 represents the voltage wave pattern resulting from the output of the synchroresolver of FIG. 1.

The voltage output of the cell pair 22 and 24 varies approximately as shown in FIG. 4 during the rotation of a shaft 12. In use the shaft 12, for example, has been rotated to some unknown amount of degrees. An ordinary synchro, such as set forth hereinabove, is utilized to determine approximately how many degrees the master shaft 12 has been rotated. The slave shaft 13 is then rotated to the approximate position of the master. At this point we are substantially guaranteed that the radiant energy from sources 16 and 16' is reflecting off the corresponding matched faces 18 and 18' of the prisms 14 and 14' located on both the master shaft 12 and the slave shaft 13. Such an output from the synchro will put us near the null region of the cell pair; that is, the region of combined cell output, as shown best on FIG. 4.

However, if by any chance the synchroresolvers 10 and 10' are not in a null region a duplicate set of cell pairs 21 and 21', 23 and 23' 90 electrical degrees out of phase with cell pair 22 and 22', 24 and 24' respectively, may be utilized with the synchroresolver of this invention. In other words, if a null region is not achieved by the output of cell pair 22, 24 and 22' and 24', the null region will be achieved by the output of cell pair 21, 23, 21' and 23'. The voltage in this null region is determined from the output of the combined cell pair 22 and 24 or cell pair 21 and 23, as the case may be. The prism 14' located on the slave shaft 13 is rotated until the output of synchroresolver 10' coincides to the output registered by the synchroresolver 10. By the use of the synchroresolvers 10 and 10' of this invention the slave shaft 13 can be rotated the exact amount of degrees the master shaft 12 has been rotated, and with the mirror source cell system of this invention the angular repeatability is within 1 arc second or less. Such accuracy is clearly sufficient for most purposes; however, in order to extend the accuracy of the reflective prism even further a synchroresolver 34 utilizing an optical rotor 36 comprising of, for example, tangential glass or quartz optically polished convex cylindrical reflectors 38 may be utilized either independently of or in combination with the prism 14 (See FIGS. 5 and 6).

Let us now consider such a convex reflector 38 of cylindrical form, i.e. an anamorphic reflector. If collimated light 40 as indicated in FIG. 7 is incident on the reflector 38, the reflected light appears to diverge from its focal line, A—B in FIG. 7.

Due to the principle of reversibility we may reverse this situation by allowing light to converge on this focal line. In this case, the reflected beam of light 40 is collimated.

Now consider for a moment, a single ray of light 42 incident on such a reflector at grazing incident, as shown in FIG. 8. As the position of incidence of the ray on the convex reflector 38 is changed, the reflected ray angle must change. If we move the incident ray 42 across the reflector 38 until it now is at grazing incidence on the other side of the reflector, the reflected ray must sweep through 360°. Now suppose that we use a converging beam of light as described previously instead of a single ray 42. In this case, a similar result is encountered, with the added condition that the optical aberrations of the system vary in a predictable and repeatable manner. Another way of looking at this result is to say that we held the incident beam stationary, and moved the reflector. In either case, the same result ensues.

Now suppose we introduce a slight angle along the axis of the cylinder for the direction of the incident beam 44, as in FIG. 9. The result is just as repeatable but perhaps slightly more difficult to calculate. This is really of no concern since the manner in which we shall use the reflected beam does not require that we predict its optical aberrations.

If the reflected beam 46 now falls on a bi-lens 48 (see FIG. 10), the light falling on each of the bi-lens segments comes to focus. We now place energy sensitive sensors 50 and 52 at the two foci. The output of these sensors 50 and 52 is indicative of the position of the reflected beam, and hence the convex reflectors 38.

An improved synchroresolver 34 of this invention utilizes a series of these convex reflectors 38 arranged in a circle, e.g., as in FIG. 5. If a single rotor of the above description is made by extrusion or casting, the dimensions of the piece can be controlled very well along the axis of the rotor. If the rotor is cut into two pieces similar to the reflective prisms shown in FIG. 2, the angular properties of the two sections will be virtually identical.

Just as shown in FIG. 1, and as hereinbefore described with reference to the reflective prisms 14 and 14', the two convex rotors 36 can be mounted on a master shaft and a slave shaft. The remainder of the design of such a synchroresolver 34 is identical with the design of synchroresolver 10, with a radiant source 56 and a lens 58; the only other difference being the use of a bi-lens 48 with a pair of sensors 50 and 52 (see FIG. 5).

In operation, the voltage output of sensors 50 and 52 is shown in FIG. 11. As clearly seen, by the use of convex reflectors the beam sweeps faster and therefore a higher output in volts/angle occur. Referring to FIG. 11, the null region is of a greater duration than in FIG. 4 and therefore in comparing the voltage outputs produced by the rotation of the master shaft and slave, the accuracy is greatly increased.

Now, for example, if a given reflector 38 is of small radius and the rotor 36 is of large radius, the reflected beam sweeps through a very large angle. As the rotor moves through a small angle, the ratio of these is referred to as the "gain" of the system. Using ordinary sources and sensors, the apparent direction of a light beam can ordinarily be determined to an accuracy of about 1 arc second, but in our case this refers to the reflected beam, not the angle of the rotor, hence, we must find how far the rotor must turn to displace the reflected beam by 1 arc second. This is determined by the size of the rotor and reflectors, hence by the gain of the system. It is not unreasonable to expect a gain of 50 or more for this type of system in a diameter of 3 inches. In such a case the repeatability of angle from one rotor to the next should be on the order of 1/50 arc second, much greater than heretofore encountered.

As in the use of a reflective prism synchroresolver 10, the approximate angular location of the rotors 36 is determined by an ordinary synchrosystem. However, if such a system fails to be accurate enough, the reflective prism 14 can be utilized in combination with the convex reflectors 38 of this invention. In such a case the reflective prism 14 locates the approximate position of the slave rotor while the convex reflectors are utilized in determining the exact location.

Alternatively, rather than utilizing a DC detection system, we could use a modulated radiation source which would allow similar performance by means of detecting an AC null. The accuracy of such a system would be as good as or better than the above DC system.

Although the invention has been described with reference to particular embodiments, it will be understood to those skilled in the art that the invention is capable of a variety of alternative embodiments within the spirit and scope of this invention.

I claim:

1. A synchroresolver comprising a shaft, a reflective prism fixedly secured to said shaft, a radiant source located adjacent said reflective prism and in such a position as to direct its radiant energy onto said reflective prism, a lens located between said radiant source and said prism, and a pair of energy sensors of shingle configuration located adjacent said reflective prism in such a position to receive the radiant energy reflected off said reflective prism.

2. A synchroresolver as defined in claim 1 wherein an additional pair of energy sensors 90 electrical degrees out of phase with said other pair of energy sensors are located adjacent said other pair of energy sensors and in such a position to receive the radiant energy off said reflective means.

3. A synchroresolver as defined in claim 1 wherein said reflective means is the combination of a reflective prism and a plurality of convex cylindrical reflectors.

4. A synchroresolver as defined in claim 3 wherein a bi-lens is located between said reflective means and said pair of energy sensors.

5. A synchroresolver as defined in claim 4 wherein an additional pair of energy sensors 90 electrical degrees out of phase with said other pair of energy sensors are located adjacent said other pair of energy sensors and in such a position to receive the radiant energy off said reflective means.

6. A synchroresolver comprising a shaft, a reflective means in the form of a plurality of convex cylindrical reflectors fixedly secured to said shaft, a radiant source located adjacent said reflective means and in such a position as to direct its radiant energy onto said reflective means and a pair of energy sensors located adjacent said reflective means and in such a position to receive the radiant energy off said reflective means.

7. A synchroresolver as defined in claim 6 wherein a bi-lens is located between said convex reflectors and said pair of energy sensors.

8. A synchroresolver as defined in claim 7 wherein an additional pair of energy sensors 90 electrical degrees out of phase with said other pair of energy sensors are located adjacent said other pair of energy sensors and in such a position to receive the radiant energy off said reflective means.

9. A synchroresolver comprising a shaft, a reflective means fixedly secured to said shaft, a radiant source located adjacent said reflective means and in such a position as to direct its radiant energy onto said reflective means, a first pair of energy sensors located adjacent said reflective means and in such a position to receive the radiant energy reflected off said reflective means and a second pair of energy sensors 90 electrical degrees out of phase with said first pair of energy sensors in such a position to receive the radiant energy off said reflective means.

10. The combination of a pair of synchroresolvers for determining the angular displacement of a master shaft, said combination comprising a master shaft and a slave shaft, a first reflective means fixedly secured to said master shaft, a second reflective means fixedly secured to said slave shaft, a first radiant source located adjacent said first reflective means and in such a position as to direct its radiant energy onto said first reflective means, a second radiant source located adjacent said second reflective means and in such a position as to direct its radiant energy onto said second reflective means, a first pair of energy sensors located adjacent said first reflective means and in such a position as to receive the radiant energy reflected off said first reflective means, a second pair of energy sensors located adjacent said second reflective means and in such a position as to receive the radiant energy reflected off said second reflective means, and said first reflective means, said first radiant source and said first pair of energy sensors being substantially identical to said second reflective means, said second radiant source and said second pair of energy sensors, respectively, whereby the output from said first and second pair of energy sensors being compared in order to determine the difference in angular displacement between said master shaft and said slave shaft.

11. The combination as defined in claim 10 wherein each of said pair of reflective means is a reflective prism.

12. The combination as defined in claim 10 wherein each of said pair of reflective means is a plurality of convex cylindrical reflectors.

13. The combination as defined in claim 10 wherein each of said pair of reflective means is the combination of a reflective prism and a plurality of convex cylindrical reflectors.